June 26, 1923.                          1,459,790

C. M. NEVIUS

COFFEE MILL

Filed June 27, 1922

Inventor
Condict M. Nevius
by his attorney
Farnum T. Dorsey

Patented June 26, 1923.

1,459,790

UNITED STATES PATENT OFFICE.

CONDICT M. NEVIUS, OF HORNELL, NEW YORK.

COFFEE MILL.

Application filed June 27, 1922. Serial No. 571,159.

*To all whom it may concern:*

Be it known that I, CONDICT M. NEVIUS, a citizen of the United States, residing at Hornell, in the county of Steuben and State of New York, have invented certain new and useful Improvements in Coffee Mills; and I do hereby declare the following to be a full, clear, and exact description of the invention, such as will enable others skilled in the art to which it appertains to make and use the same.

The general object of the present invention is to produce a mill, for grinding coffee or similar material, which shall be simple in construction but efficient in operation. A more particular object of the invention is to produce a mill in which the rotating member may be driven at high speed, thereby permitting the use of an economical high-speed electric motor as the source of power, without difficulty or complication in the feeding of the coffee, or the necessity of speed-reducing gearing.

Other objects of the invention, and the features of construction by which the several objects are attained, will be noted in connection with the following description of the preferred embodiment of the invention.

Figure 1:
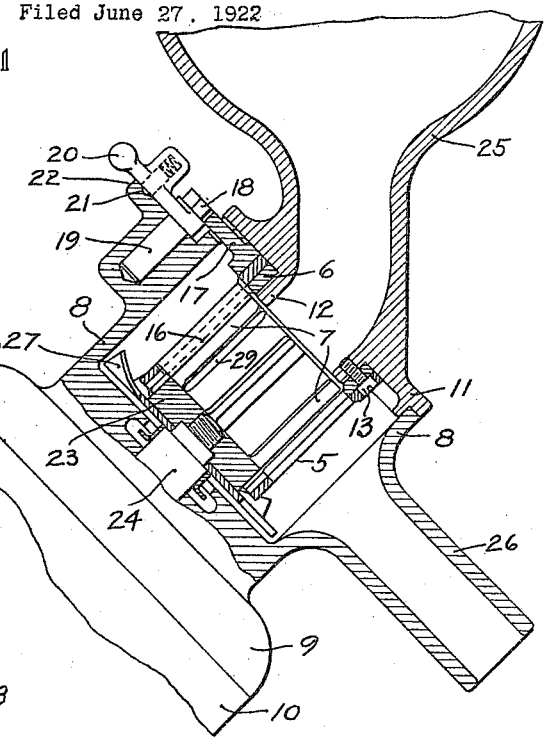
Figure 3:
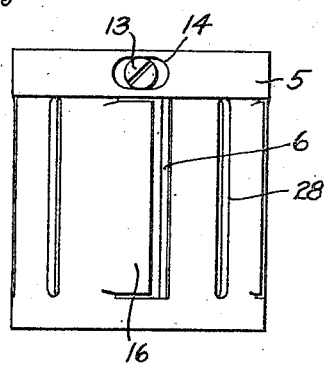
Figure 2:
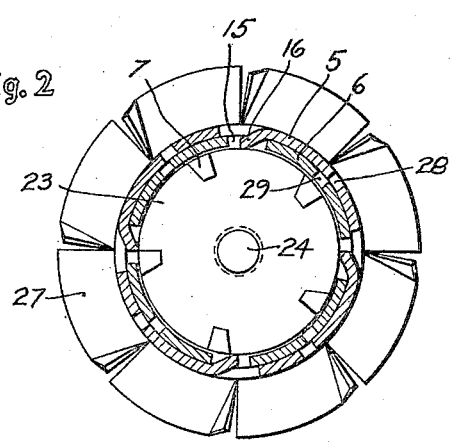
Figure 4:
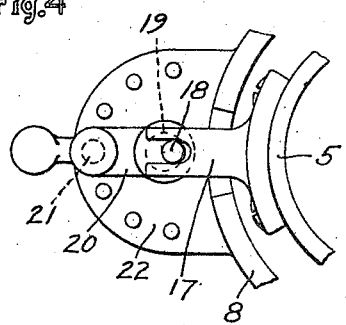

In the accompanying drawings Fig. 1 is a side-elevation of a coffee-mill embodying the invention, with parts shown in section. Fig. 2 is a cross-section, on a larger scale, of the operative instrumentalities, of the mill. Fig. 3 is a side-elevation of the cutter-cylinder and the guard-cylinder, in their operative relation; and Fig. 4 is a detail view of the means for adjusting the cutter-cylinder.

The invention is illustrated as embodied in a coffee-mill in which the principal operative instrumentalities have the form of two concentric hollow cylinders, 5 and 6, of which one may be designated as the "cutter-cylinder" and the other as the "guard-cylinder." In the illustrated arrangement the inner cylinder 6 is the guard-cylinder, though this is not necessarily the case, and this inner cylinder constitutes a container for the coffee which is to be ground, and also encloses impelling-means for imparting rapid revolution to the coffee in the container. These means comprise arms 7, arranged in a circle coaxial with the cylinders.

The cylinders are enclosed in a housing 8, which is shown as integral with one end 9 of the frame of an electric motor 10 by which the mill is actuated. The upper end of the housing is closed by a cover 11, which is centrally perforated for the introduction of the coffee. This cover serves as a support for the cylinders 5 and 6, being provided with an inwardly-projecting neck 12 to which the upper end of the guard-cylinder is closely fitted. The cylinder is fixed to the neck by one or more screws 13.

The upper end of the cutter-cylinder 5 is provided with a slot 14 to receive the head of the screw 13, whereby the cutter-cylinder is retained against lengthwise movement but permitted a limited rotational movement around the guard-cylinder.

The guard-cylinder is continuous at the upper end, but is provided with four longitudinal slots 15 extending from the bottom nearly to the upper end. The cutter-cylinder is continuous at both ends, but is slotted at four points between the ends and the metal at one side of each of these four slots is bent inwardly and ground sharp at the inner angle, thus providing integral cutter-blades 16. These blades extend inwardly through the slots 15 in the guard-cylinder, and their cutting edges project slightly within the inner surface of the guard-cylinder. The cutter-blades partially close the slots 15 in all positions, but except in one extreme position a portion of each slot remains open, the width of this open part being what is hereinafter called the "effective width" of the slot.

The effective width of the slots 15 is adjusted by partial rotation of the cutter-cylinder. As a convenient means for this purpose, an arm 17 is fixed to the cutter-cylinder and is provided with a forked end which embraces a pin 18. This pin projects eccentrically from the end of a shaft 19 journalled in a lug on the housing 8. A lever or handle 20 is used to turn the shaft and thus cause the pin to swing the arm 17, and the handle is normally fixed in adjusted position by a spring-pressed plunger 21, which cooperates with recesses in the surface of a segment-plate 22. By these means the cutter-cylinder may be turned to, and held in various positions, leaving more or less of the width of the slots 15 open and effective.

The coffee-impelling arms 7 are integral with a head 23 which closes the lower end of the receptacle or guard-cylinder 6, and this head is fixed directly on the end of the armature-shaft 24 of the motor 10, so that the impeller is rotated directly at high speed, in a direction such as to project the coffee-beans against the edges of the blades 16. The revolution of the coffee is sufficiently rapid to produce a substantial centrifugal force, by which the beans are pressed firmly against the inner surface of the container. When each bean encounters a cutter-blade, therefore, a chip or layer is cut from the bean, much in the manner of a plane, the severed material escaping through a slot 15 into the housing 8. The depth of the cut, and thus the fineness of the ground material, is determined by the effective width of the slot 15, being coarser as the slot is widened.

The coffee is fed into the receiver by gravity, a suitable hopper 25 being mounted on the cover 11, and the rate of feed is controlled automatically in accordance with the rate at which the cutter-blades remove material from the beans.

To insure the starting of the motor under load, it is desirable that there be no position in which there is undue resistance to movement of the impeller. Accordingly, a number of arms 7 is used which is prime to the number of blades 16, so that there is no position of the machine in which more than one arm 7 is in cooperative relation with a blade.

Finely-ground coffee has a tendency to stick in the housing, and to insure its discharge a fan is provided, in the form of a plate 27, from the margin of which inclined lugs or vanes are struck up. This fan, being mounted on the motor-shaft at the bottom of the housing, is rotated rapidly, and it causes enough agitation and draft of air to insure the expulsion of the coffee through a spout 26 which is provided for its discharge.

When it is desired to grind the coffee very fine, it is necessary to reduce the effective width of the slots 15 to such a degree that they may not provide sufficiently for the egress of the ground material. To provide against this, the cylinders 5 and 6 may be provided with slots 28 and 29, respectively, which alternate with the blade-slots 15 and which register with each other when the slots 15 are nearly closed. It has been found that while the pulverized material will escape through these slots, the unground parts of the coffee-beans will pass across them, owing to the rapidity of their motion.

The parts of the machine have been shown in an inclined position adapted to facilitate the gravity feed of the coffee, and its escape by gravity from the housing. This position of the machine, and the results flowing from it, are not essential, however, to the invention. It will be apparent, in general, that the invention is not limited to the embodiment thereof hereinbefore described and illustrated in the accompanying drawings, but that it may be embodied in various other forms, within the spirit of the invention and the scope of the following claims.

The invention claimed is:

1. A coffee-mill comprising: a cylindrical container provided with a plurality of longitudinal slots; a cutter-blade projecting into the container at each slot; and means, for imparting revolution to coffee within the container, comprising a circle of impelling members revoluble close to and substantially parallel with the edges of the blades; the respective numbers of blades and of impelling members being prime to each other.

2. A coffee-mill comprising: a housing; a motor fixed to one end of the housing and having a shaft projecting into the housing; a rotary impeller fixed to said shaft; a cylindrical coffee-container enclosed in the housing and fixed to the other end thereof coaxially with the motor and the impeller; means for introducing coffee into the container through the end of the housing to which the container is fixed; and a cutter-blade projecting into the container and close to the path of movement of the impeller.

3. A coffee-mill comprising: inner and outer concentric cylinders; the inner cylinder being longitudinally slotted and the outer cylinder provided with inwardly-directed cutter-blades projecting through the slots of the inner cylinder; means for holding the cylinders in relatively adjusted position, whereby the effective width of the slots is controlled; and means for revolving a body of coffee within the inner cylinder and against the edges of the cutter-blades.

4. A coffee-mill comprising: concentric cylinders, the outer one provided with inwardly-projecting cutter-blades and the inner one with slots through which said blades project; means for imparting revolution to coffee within the inner cylinder; the cylinders having registering slots alternating with the blade-receiving slots of the inner cylinder; and means for controlling relative rotation of the cylinders to control the effective width of the slots.

5. A coffee-mill comprising: concentric cylinders with registering slots, the metal at one side of the slot in one cylinder being bent inwardly to form a cutter-blade, and the metal at the opposite side of the corresponding slot of the other cylinder cooperating with said blade as a guard to determine the fineness of the ground material;

means for controlling relative rotation of the cylinders to fix the distance between each blade and its guard; and impelling means for revolving coffee within the inner cylinder and forcing it against the blades.

6. A coffee-mill comprising: a guard-cylinder provided with a plurality of longitudinal slots; a plurality of blades projecting into said slots from the outside of the guard-cylinder; means rigidly connecting the several blades and rotatable relatively to the guard-cylinder; means for producing such relative rotation to vary the effective width of said slots; and impelling means for revolving coffee within the inner cylinder and forcing it against the blades.

CONDICT M. NEVIUS.